(12) United States Patent
Corr et al.

(10) Patent No.: US 10,599,129 B2
(45) Date of Patent: Mar. 24, 2020

(54) METHOD FOR DATA NORMALIZATION

(71) Applicant: Duro Labs, Inc., Los Angeles, CA (US)

(72) Inventors: Michael G Corr, Los Angeles, CA (US); Kellan O'Connor, Los Angeles, CA (US)

(73) Assignee: Duro Labs, Inc., Los Angeles, CA (US)

( * ) Notice: Subject to any disclaimer, the term of this patent is extended or adjusted under 35 U.S.C. 154(b) by 40 days.

(21) Appl. No.: 16/056,420

(22) Filed: Aug. 6, 2018

(65) Prior Publication Data

US 2019/0113905 A1 Apr. 18, 2019

Related U.S. Application Data

(60) Provisional application No. 62/541,614, filed on Aug. 4, 2017.

(51) Int. Cl.
*G06F 17/00* (2019.01)
*G05B 19/408* (2006.01)
*G06F 17/24* (2006.01)

(52) U.S. Cl.
CPC .. *G05B 19/408* (2013.01); *G05B 2219/31367* (2013.01); *G06F 17/243* (2013.01)

(58) Field of Classification Search
CPC ........ G05B 19/408; G05B 2219/31367; G06F 17/243
See application file for complete search history.

(56) References Cited

U.S. PATENT DOCUMENTS 5,260,866 A * 11/1993 Lisinski ............. G06Q 10/0875
700/97
5,586,025 A * 12/1996 Tsuji ...................... G06N 5/046
715/207
6,718,336 B1 * 4/2004 Saffer .................... G06F 16/25
(Continued)

OTHER PUBLICATIONS

Schild, Peter J. et al, "Open Data Exchange with HP PE/Solid Designer", Hewlett-Packard Journal 46.n5: p35(16). Hewlett Packard Company. (Oct. 1995), downloaded from https://www.hpl.hp.com/hpjournal/95oct/oct95a4.pdf. (Year: 1995).*
(Continued)

*Primary Examiner* — Laurie A Ries
(74) *Attorney, Agent, or Firm* — Run8 Patent Group, LLC; Peter Miller (57) ABSTRACT

One variation of a method for normalizing manufacturing data includes: identifying a type of the digital component description document, including a set of part descriptor entries describing a set of physical parts, based on categories of physical parts described in part descriptor entries within the digital component description document; accessing a set of part descriptor rules corresponding to the type of the digital component description document; detecting deviation of a part descriptor entry, in the set of part descriptor entries, from a part descriptor rule in the set of part descriptor rules; at the user portal, serving a prompt to manually correct the part descriptor entry; and, in response to alignment between the digital component description document and the set of part descriptor rules, importing the set of part descriptor entries into the component library.

20 Claims, 3 Drawing Sheets

(56) References Cited

U.S. PATENT DOCUMENTS

| | | | | |
|---|---|---|---|---|
| 7,130,860 B2* | 10/2006 | Pachet | | G06F 16/40 |
| | | | | 707/769 |
| 7,149,967 B2* | 12/2006 | Pollock | | G06F 17/212 |
| | | | | 715/243 |
| 7,194,106 B2* | 3/2007 | Brundage | | H04N 1/00838 |
| | | | | 380/201 |
| 7,302,443 B2* | 11/2007 | Nakajima | | G06F 17/50 |
| 8,117,537 B1* | 2/2012 | Vell | | G06F 17/2205 |
| | | | | 715/236 |
| 8,805,766 B2* | 8/2014 | Ray | | G06F 16/345 |
| | | | | 706/47 |
| 10,120,844 B2* | 11/2018 | Dettman | | G06F 16/254 |
| 10,332,775 B2* | 6/2019 | Rusli | | H01L 23/3107 |
| 10,372,833 B2* | 8/2019 | Reed | | G06F 17/50 |
| 2001/0035771 A1* | 11/2001 | Mullarkey | | H03K 19/1732 |
| | | | | 326/39 |
| 2003/0208473 A1* | 11/2003 | Lennon | | G06F 16/71 |
| 2006/0112123 A1* | 5/2006 | Clark | | G06F 17/246 |
| 2008/0120070 A1* | 5/2008 | Miller | | G06F 17/5086 |
| | | | | 703/1 |
| 2008/0162548 A1* | 7/2008 | Ahmed | | G06F 16/80 |
| 2008/0183674 A1* | 7/2008 | Bush | | G06F 16/83 |
| 2013/0273968 A1* | 10/2013 | Rhoads | | G06K 9/6253 |
| | | | | 455/556.1 |
| 2015/0379456 A1* | 12/2015 | Aynsley-Hartwell | | G09C 1/00 |
| | | | | 705/7.15 |
| 2016/0369616 A1* | 12/2016 | Leblanc | | G06F 16/215 |
| 2018/0032512 A1* | 2/2018 | Oliner | | G06F 16/48 |

OTHER PUBLICATIONS

Yingguang Li, et al, "Data Description Norm and Key Techniques of Web-based Parts Library", Proceedings of the Ninth International Conference on Computer Supported Cooperative Work in Design (IEEE Cat. No. 05EX1061), 2005, downloaded from https://ieeexplore.ieee.org/abstract/document/1504085 (Year: 2005).*

* cited by examiner

METHOD FOR DATA NORMALIZATION

CROSS-REFERENCE TO RELATED APPLICATIONS

This Application is a continuation application of U.S. Patent Application No. 62/541,614, filed on 4 Aug. 2017, which is incorporated in its entirety by this reference.

TECHNICAL FIELD

This invention relates generally to the field of data normalization and more specifically to a new and useful method for normalizing part description data describing physical parts input into a product lifecycle management tool.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

Figure 1:
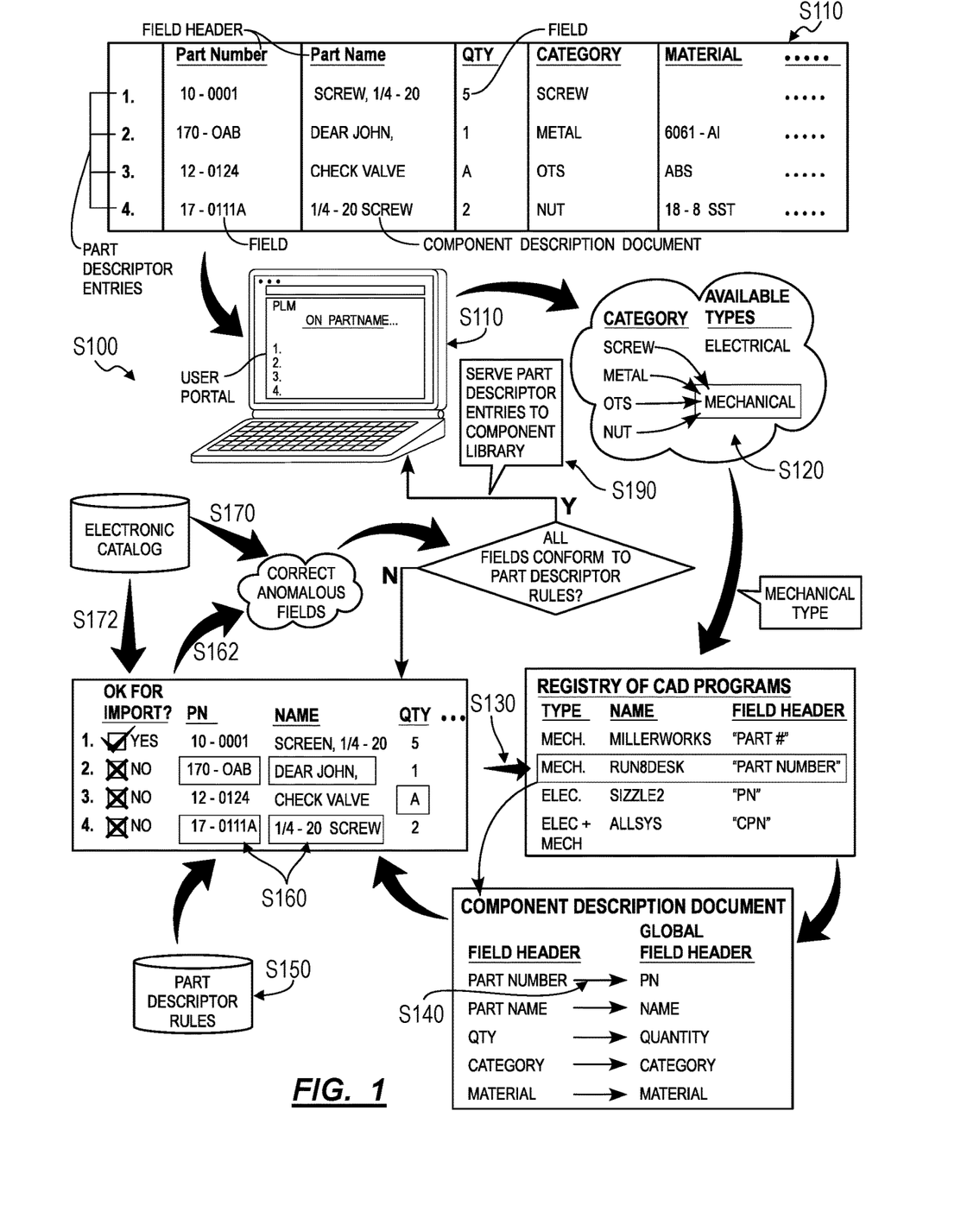
FIG. 1 is a flowchart representation of a method.
Figure 3:
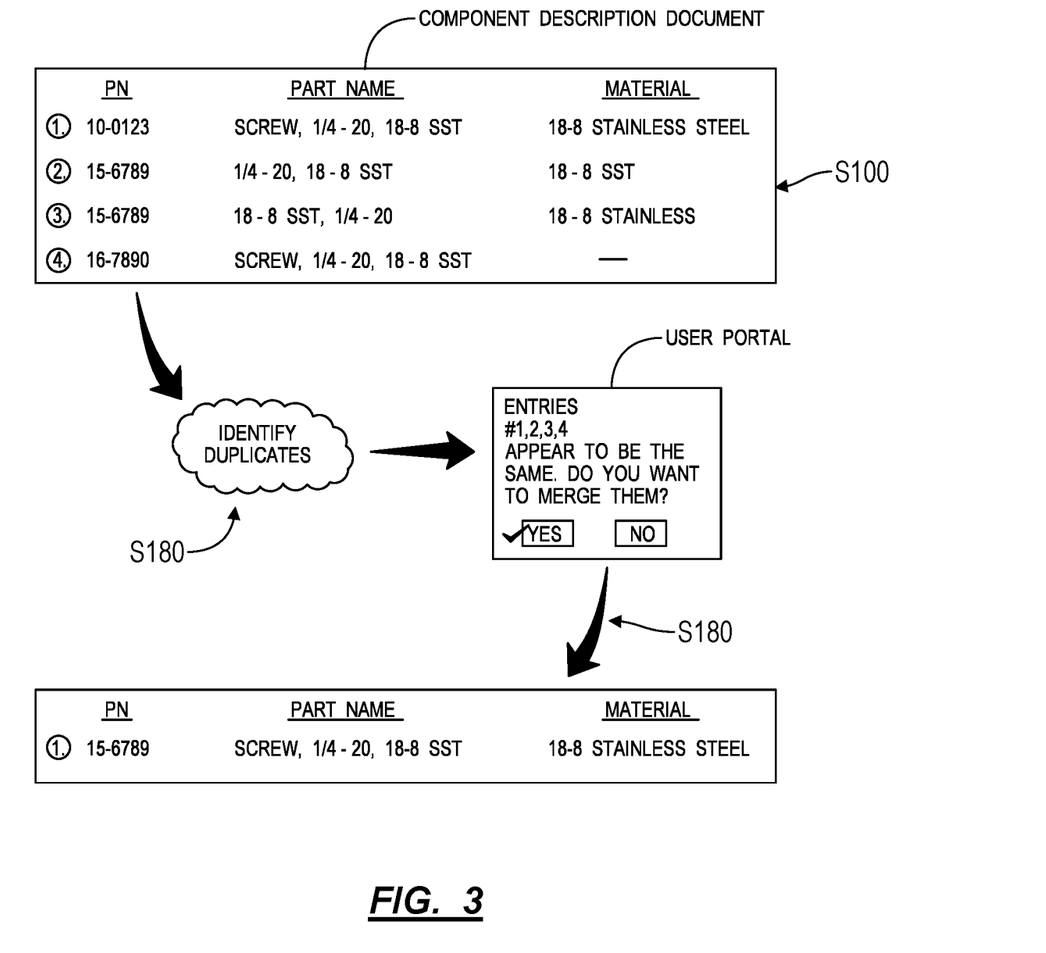
FIG. 3 is a flowchart representation of a second variation of the method.

As shown in FIGS. 1 and 3, a method S100 for normalizing manufacturing data includes: at a user portal, uploading an digital component description document including a set of part descriptor entries describing a set of physical parts in Block S110; identifying a type of the digital component description document based on categories of physical parts described in part descriptor entries within the digital component description document in Block S120; identifying a particular computer-aided design program that output the digital component description document based on the type of the digital component description document and a set of field headers extracted from the digital component description document in Block S130; based on the particular computer-aided design program, aligning the set of field headers extracted from the digital component description document to global field headers defined in a component library in Block S140; accessing a set of part descriptor rules corresponding to the type of the digital component description document in Block S150; detecting deviation of a first part descriptor entry, in the set of part descriptor entries, from a first part descriptor rule in the set of part descriptor rules in Block S160; at the user portal, serving a prompt to manually correct the first part descriptor entry in Block S162; in response to detecting a subset of like part descriptor entries in the set of part descriptor entries, consolidating the subset of like part descriptor entries into a single part descriptor entry in Block S180; and, in response to alignment between the digital component description document and the set of part descriptor rules, importing the set of part descriptor entries into the component library in Block S190.

One variation of the method S100 includes: at a user portal, uploading an digital component description document including a set of part descriptor entries describing a set of physical parts in Block S110; identifying a type of the digital component description document based on categories of physical parts described in part descriptor entries within the digital component description document in Block S120; identifying a particular computer-aided design program that output the digital component description document based on the type of the digital component description document and a set of field headers detected in the digital component description document in Block S130; and based on a pre-loaded field header naming scheme associated with the particular computer-aided design program, aligning the set of field headers detected in the digital component description document to global field headers defined in a component library in Block S140. This variation of the method S100 also includes, for a first part descriptor entry in the digital component description document: querying a first electronic catalog for a first commodity component descriptor containing field values analogous to a subset of values in the first part descriptor entry and, in response to a difference between a particular field value in the first commodity component descriptor and a particular value in a corresponding field in the first part descriptor entry, replacing the particular value in the first part descriptor entry within the particular field value from the first community component descriptor in Block S170; and serving a prompt to confirm the particular field value in the first part descriptor entry via the user portal in Block S172. This variation of the method S100 further includes, in response to alignment between part descriptor entries in the digital component description document and matched commodity component descriptors accessed from the first electronic catalog, importing the set of part descriptor entries into the component library in Block S190.

2. Applications

Generally, the method S100 can be executed by a system including a user portal executed by a computer system to normalize data originating from a variety of sources; to correct inconsistent, incorrect, and/or duplicate data prior to entry into a component library; and to track status of production of physical parts described by data entered in the component library throughout a product's lifecycle. In particular, the method can be executed by the system to: upload an digital component description document (hereinafter the "DCDD") to the user portal; identify a type of component (e.g., a mechanical or electrical assembly) described within the DCDD; translate field headers of the DCDD into alignment with global (i.e., standardized) field headers; modify part descriptor entries of the DCDD to conform with part descriptor rules defined for the type of component and the global field headers; merge duplicate or highlight similar part descriptor entries; and, after standardizing the part descriptor entries, import part descriptor entries of the DCDD into a component library. Therefore, the system can execute the method S100 to gate entry of anomalous, erroneous, redundant, and/or incomplete data into the component library and enable a user to efficiently scrub aberrant data prior to import of the part descriptor entries into the component library, thereby ensuring that data entering the component library remains accurate and thus ensuring that data subsequently output by the component library remains accurate.

Once the system validates part descriptor entries in the DCDD, the system can import part descriptor entries described within the DCDD into the component library (e.g., a component library of a product lifecycle management, or "PLM," software program). By peremptorily validating part descriptor entries prior to import, the system can ensure presence and accuracy of essential information relevant to manufacture of physical parts described by the part descriptor entries. From the part descriptor entries in the component library, the system can prepare physical parts described by the part descriptor entries for release to a supplier, vendor, or other manufacturer for production (e.g., manufacture, finishing, or assembly). The system can enable a user to specify production requirements (i.e., "part specifications") for physical parts and thus support suppliers in producing physical parts conforming to the user's production requirements while minimizing supplier confusion stemming from inconsistent, incomplete, and/or non-standardized information that may otherwise be output by the PLM and communicated by the user to suppliers. Therefore, the system can facilitate tracking of production status, production quality, and production schedule of physical parts in order to expedite shipment (i.e., sale) to consumers and/or merchants.

By maintaining integrity and consistency of part descriptor entries in the component library, the system can define, maintain, and/or promote consistent application of industry standards for part specification without burdening a user with recalling and manually implementing industry best practices. Thus, the system can store and communicate clear and uniform instructions for production of physical parts described by part descriptor entries in the component library. Through unambiguous part descriptor entries, the system can prepare physical parts for timely release to suppliers (and/or contract manufacturers) for procurement, manufacture, production, and assembly and also alleviate confusion and time spent amending irrelevant, duplicative, missing, and/or erroneous part descriptor entries after entry to the component library (or after release to a supplier).

Furthermore, the system can reduce time spent entering and maintaining (e.g., "scrubbing") part descriptor entries throughout the component library after import by limiting aberrant data initially entered to the component library. By quarantining aberrant part descriptor entries that fail to conform with part descriptor rules (and by prompting a user to manually modify part descriptor entries to conform with part descriptor rules), the system can verify and ensure that all data entered into the component library: conform with the part descriptor rules; correspond to (i.e., make sense for) the physical part described by the part descriptor entries; and observe industry best practices prior to import, thereby preventing corruption and non-uniformity across elements in the component library. Additionally, the system can learn user or global preferences, frequent corrections, and/or other customizations of part descriptor entries and can automate validation of part descriptor entries during future uploads (e.g., through machine learning) accordingly.

Therefore, the system can execute the method S100 to limit costly miscommunication and confusion between users and suppliers that delays production and shipment of high quality physical parts and components.

3. Example

In one example, a user may export or download a DCDD, such as a bill of materials (hereinafter "BOM") for a physical assembly, from a computer-aided drafting design (or computer-aided design, hereinafter "CAD") program that the user employed to design and model a physical assembly. The CAD program can export the DCDD in the form of a spreadsheet or table including a set of part descriptor entries describing attributes of a set of physical parts in the physical assembly. In this example, the set of part descriptor entries in the DCDD can be organized into rows and columns, with each row representing a particular physical part and each column representing an attribute— under a field header—of the particular physical part, such as a part number, a part name, a quantity of the particular physical part in the BOM, a material of the particular physical part, dimensions of the particular physical part, etc.

The system can then upload the DCDD to a user portal of the PLM software program in, for example, a web browser or video asset executed by the user's computer system. The system can first read field headers of the DCDD that describe attributes (e.g., part name, part category, material, quantity, etc.) of part descriptor entries. However, various CAD programs may define different field headers to describe the same part attributes. For example, a first CAD program may label a field header describing a part number of the physical part as "Part #", a second CAD program may label the field header "CPN," and a third CAD program may label the field header "Customer Part Number." In this example, the system can read the field header "Part #" and identify the label "Part #" as unique to the first CAD program. Therefore, the system can determine that the DCDD likely originated from (i.e., was exported by) the first CAD program. Based on a predefined mapping scheme for field headers of the first CAD program to predefined global field headers, the system can determine that the field header "Part #" for the first CAD program describes part numbers of physical parts identified as "PN" by the global field header for the component library. Thus, the system can replace the "Part #" field header with "PN" in the DCDD upon receipt at the user portal.

Additionally, the system can read part descriptor entries of the DCDD to determine a type of assembly described by the DCDD and, based on this type of assembly, identify deviations of part descriptor entries within the DCDD from part descriptor rules predefined for the type of the assembly. For example, the system can read the DCDD and identify: a first part descriptor entry describing a screw, a second part descriptor entry describing an injection-molded enclosure; and a third part descriptor entry describing an adhesive. In this example, the system can classify the DCDD as describing a "mechanical" assembly (or otherwise including "mechanical" components) due to absence of electrical components in the DCDD. Based on the type of the assembly described by the DCDD (hereinafter the "type" of the DCDD), the system can access a set of part descriptor rules for mechanical components. In this example, the set of part descriptor rules can include essential field headers for mechanical components (e.g., material, dimensions, category, and/or manufacturing process), preferred formatting protocols for part descriptor entries (e.g., a part name of "SCREW 0.750" ¼-20" rather than "SCREW, ¼-20, ¾""), etc.

The system can then scan fields within a part descriptor entry in the DCDD for values that conflict with the set of part descriptor rules. For example, the system can identify a first part descriptor entry missing a value in a "Material" field, which violates a part descriptor rule for mechanical-type DCDDs. The system can also identify a second part descriptor entry with a part number "10-0s13" rather than a part number in the format of "10-00000" specified by a second part descriptor rule for mechanical-type DCDDs (e.g., predefined by an engineering organization interfacing with the system during design and production of the assembly). Therefore, the system can highlight the first and second part descriptor entries—such as by applying color overlays over conflicting fields in these DCDDs within the user portal or by moving these DCDDs to the top of the user portal—thereby prompting the user to manually correct these aberrant part descriptor entries.

For a part descriptor entry representing a commodity component supplier by an external vendor, the system can additionally or alternatively: extract a subset of values from the part descriptor entry, such as a category of the part descriptor entry from under a "Category" field header in the DCDD and a part number of the part descriptor entry from under a "Part Number" field header in the DCDD; select a vendor for commodity components within the category; and then query a digital catalog from this vendor for this part number in order to access a corpus of field data for this commodity component in this category and associated with the same part number. The system can then confirm that this corpus of field data (e.g., in the form of a commodity component descriptor containing field values for a known commodity component) is equivalent or analogous to the part descriptor entry by matching one or more additional values in the part descriptor entry to field values in the corpus of field data. Accordingly, the system can copy field values from the corpus of field data over to all fields in the part descriptor entry, to all corresponding empty fields in the part descriptor entry, or to corresponding fields in the part descriptor entry conflicting with the set of part descriptor rules selected for the DCDD. The system can thus leverage commodity component data stored in a digital catalog hosted by an external vendor to automatically correct or complete a part descriptor entry prior to loading the part descriptor entry into the component library. However, if the system detects a part descriptor entry that conflicts with the set of part descriptor rules but fails to match the part descriptor entry to a commodity component descriptor in a digital catalog, the system can serve a prompt to manually correct or validate the part descriptor entry through the user portal.

Upon confirmation that all part descriptor entries of the DCDD conform to the set of part descriptor rules, the system can release the part descriptor entries into a searchable and sortable component library, such as the form parameterized part descriptor entries, thereby ensuring that part descriptor entries entering the component library are correct and complete and preventing incorrect or incomplete part descriptor entries from entering the component library.

4. System

Blocks of the method S100 can be executed by a system, such as a cloud-based computer, a mainframe computer system, a grid-computer system, a computer network, or any other computer system, such as in the form of a local computing device or a remote server. In one implementation, the system can execute Blocks of the method S100 remotely at a remote computer system that: hosts the component library; and uploads data to and downloads data from a user portal rendered in an in-browser application (e.g., a web-browser window) or a native application (e.g., a "desktop" application) executing on a local computer system. Alternatively, the system can execute the method S100 locally at a local computer system in an in-browser application or a native application executing on the local computer system. The native application and/or the in-browser application is configured: to execute on a computer system (e.g., a local desktop computer, smartphone, tablet); to host a user portal; to receive DCDDs and part descriptor entries; and to selectively serve prompts to amend part descriptor entries.

5. Data Import

Block S110 of the method S100 recites, at a user portal, uploading a DCDD including a set of part descriptor entries describing a set of physical parts. Generally, in Block S110, the system accesses a DCDD, such as a BOM of a physical assembly or a list of part descriptor entries of a set of physical parts, and loads the DCDD into the user portal for validation.

In one implementation, the system can upload to the user portal a DCDD in a spreadsheet or table form exported from a CAD program or a product data management (PDM) tool affiliated with a CAD program. The DCDD can include a set of part descriptor entries detailing essential information about a set of physical parts and/or an assembly of the set of physical parts. From the DCDD and the part descriptor entries, a user and/or a supplier may quickly understand information relevant to production (e.g., machining, forming, molding, or assembly) of the physical parts and/or assemblies detailed by the DCDD.

In a similar implementation, the system can load a digital BOM including a set of part descriptor entries of a first set of physical commodity parts and a second set of physical custom parts in Block S110, wherein each part descriptor entry includes a part number, a part name, and a category of a corresponding physical part.

Furthermore, the system can: import the DCDD directly from a CAD program; upload the DCDD that was previously generated by a CAD program and saved in local memory or to a remote or network database; or previously generated by a CAD program, stored locally or remotely, and subsequently manually edited by a user; etc. However, the system can upload the DCDD—in any other format—to the user portal in any other way.

6. Context

Blocks S120 of the method S100 recites identifying a type of the DCDD based on categories of physical parts described within the DCDD in Block S120; and Block S130 of the method S100 recites identifying a computer-aided design program of the DCDD based on the type of the DCDD and a set of field headers extracted from the DCDD. Generally, in Block S120 and S130, the system reads part descriptor entries and field headers of the DCDD in order to determine the type of DCDD described by the part descriptor entries and the source of the DCDD.

6.1 Context: Type

The system executes Block S120 in order to determine a type of the DCDD based on categories of physical parts described within the DCDD. Generally, the system can implement natural language processing and/or pattern matching techniques: to identify patterns and relationships between part descriptor entries within the DCDD; and to identify a type (or "general function") of a physical product described by the DCDD. The system can then access rules for DCDDs of this type.

In one implementation, the system can characterize the type of the DCDD generally, such as "mechanical," "electrical," "electromechanical," or "other" type of component, based on functions of constituent part descriptor entries within the DCDD. The system can also identify the type of the DCDD with greater specificity. For example, the system can define the DCDD as a "mechanical: hydraulic" type component based on part descriptor entries describing valves and hoses within the DCDD.

The system can compare the category of each part descriptor entry in the DCDD (e.g., sequentially, row by row in the DCDD) to reference maps (e.g., lookup tables stored in a remote database) in order to characterize a type of each part descriptor entry in the DCDD and then predict a type of physical product represented by the DCDD based on types of these part descriptor entries. In particular, the system can access lookup tables that define relationships between a category of a part descriptor entry (e.g., "battery") and the type or function of the part descriptor entry (e.g., "electrical component"). After characterizing each part descriptor entry based on these reference maps, the system can aggregate the types of each part descriptor entry—in the set of part descriptor entries in the DCDD—to predict a global type of the physical product described by the DCDD. For example, the system can: scan the DCDD; characterize a subset of part descriptor entries in the DCDD as "electrical-type" part descriptor entries based on alignment between values contained in categories of these part descriptor entries and a reference map for electronics products; and then determine the type of the DCDD as "electrical" in response to presence of electrical-type part descriptor entries in the DCDD.

In another example, the system can implement a part number format reference map that specifies prefixes of part numbers for a physical parts category. To identify the category of a particular part descriptor entry, the system can: read the part number (e.g., "22-00013"); compare the prefix of the part number to the part number format reference map (e.g., Prefix: 22-XXXXX; Category: Injection-Molded Plastics; Type: Mechanical); identify the particular part descriptor entry as "Injection-Molded Plastic" based on the relationship between this part number prefix and part types represented in this part number reference map; and then classify the particular part descriptor entry as a mechanical component accordingly.

Additionally or alternatively, the system can implement natural language processing to identify the type of a part descriptor entry in the DCDD based on a name, category, part number, description, and/or other value contained in one or more fields (e.g., cells of a spreadsheet) of the part descriptor entry and then predict a type of the DCDD based on types of multiple part descriptor entries in the DCDD. For example, the system can: detect part descriptor entries—in the DCDD—including the character strings "Battery," "Capacitor," and/or "PCB" under a "Category" field header (described below); identify these part descriptor entries as representing electrical components; and thus identify the type of the DCDD as electrical. In another example, the system can: detect part descriptor entries—in the DCDD— including the character strings "Plastic," "Metal," and/or "O-Ring" under the "Category" field header; identify these part descriptor entries as representing mechanical components; and thus identify the type of the DCDD as mechanical. In yet another example, the system can: detect part descriptor entries—in the DCDD—including the character strings "Screw," "Solenoid," "Battery," "Relay," and/or "Op-Amp" under the "Category" field header; identify these part descriptor entries as representing electrical and mechanical components; and thus identify the type of the DCDD as electromechanical.

Therefore, in Block S120, the system can: detect a set of field headers in the DCDD; extract a set of values, for the set of part descriptor entries, under a category header in the set of field headers in the DCDD; implement natural language processing to interpret values, in the set of values, as a set of category types; and identify the type of the DCDD as one of a mechanical-type and a digital-type based on a predefined DCDD rule and a combination of unique category types in the set of category types.

However, the system can implement any other method and technique to identify the type of the DCDD in Block S120.

6.2 Context: Source

The system executes Block S130 to determine a source from which the DCDD originated. Generally, the system can isolate the source of the DCDD (e.g., a CAD program) from which the DCDD was exported based on field headers read from the DCDD and based on known field header naming schemes of various CAD programs. The system can then retrieve a field map for this source of the DCDD and then implement this field map to determine or verify the type of each field represented in the DCDD, as described below. In particular, the system can: extract values from fields of unknown types in the DCDD and predict a type of a physical product represented by the DCDD in Block S120; predict a particular source of the DCDD based on the type of this physical product and metadata (e.g., field headers, field header format, and/or field header order) contained in the DCDD in Block S130; and then confirm a specific type of each field in the DCDD based on a known field header format, order, and type set for this particular source. The system can therefore execute Blocks S120, S130, and S140 to streamline identification of field types in the DCDD while minimizing opportunity for errors and without necessitating manual indication of the source of the DCDD by the user.

In one implementation, the system implements natural language processing and/or pattern recognition to read field headers within the DCDD. For example, CAD programs may output DCDDs with field headers arranged in their top rows (or in first rows including data). A particular field header may describe the particular type of content in cells within the same column and below the particular field header in the DCDD. Each row in the DCDD may correspond to a single part descriptor entry. A particular cell at the intersection of the column corresponding to the particular field and row corresponding to a particular part descriptor entry in the DCDD can therefore contain a value of this particular type for the particular part descriptor. For example, a field header containing the character string "Material" can indicate that cells below the field header and in the same column correspond to material types of part descriptor entries in the DCDD.

Based on the type of the DCDD determined by the system in Block S120 described above, the system can isolate a list (or a "pool") of potential CAD programs from which the DCDD may have originated. The computer system can then: access a set of known field headers, field header formats, and/or field header orders, etc. for each CAD program in this list; extract character strings and other characteristics of field headers from the DCDD; and isolate a particular CAD program—from this list—that exhibits greatest similarity to like field header characteristics extracted from the DCDD. For example, the system can be preloaded with a table or other database containing identifiers of: CAD programs A, B, and C that output "mechanical-type" DCDDs; CAD programs B, D, and E that output "electrical-type" DCDDs; and CAD program B that outputs "electromechanical" type DCDD. The computer system can thus generate a list of a subset of CAD programs configured to output DCDDs of the same type as the DCDD uploaded by the user. In this example, rather than compare field header characteristics extracted from the DCDD to known field header characteristics of CAD programs A through E (and dozens or hundreds of other CAD programs) configured to output DCDDs of multiple different types, the system can restrict the pool of potential CAD programs to A, B, and C in Block S130 after determining that the DCDD corresponds to a "mechanical-type" physical product in Block S120.

In this implementation, the system can maintain a field header map of known unique field header naming conventions of known or common CAD programs. In response to a match between a unique field header of a particular CAD program and a field header extracted from the DCDD, the system can confirm the particular CAD program as the source of the DCDD (i.e., the CAD program that exported the DCDD). In the foregoing example, the field header map can indicate: that DCDDs originating from CAD program A typically include "CPN," "QTY", "MATERIAL", and "THREAD_PITCH" field headers; and that DCDDs originating from CAD program B typically include "part_number," "quantity", "material", and "thread_pitch" field headers In this implementation, the system can perform a string comparison between field headers detected in the DCDD and field headers associated with a set of known CAD programs (e.g., a subset of known CAD programs associated with an inferred type of the DCDD). In this example, the system can read field headers detected in the DCDD—including "part_number," "quantity", and "material"- and match these field headers to known field headers associated with CAD program B.

Therefore, in Block S130, the system can: retrieve a list of CAD programs associated with the type of the DCDD—identified in Block S120—from a registry of CAD programs; access a field header model defining a field header naming scheme for each CAD program in the list of CAD programs; detect the set of field headers in the DCDD; and then isolate the particular CAD program, from the list of CAD programs, based on alignment between the set of field headers and the field header model for the particular CAD program.

However, the system can implement any other methods or techniques to automatically identify the CAD program from which the DCDD originated based on values contained in the DCDD.

7. Aligning Field Headers

Block S140 of the method S100 recites, based on the computer-aided design program, aligning the set of field headers extracted from the DCDD to global field headers defined in a component library in Block S140. Generally, in Block S140, the system can translate and sort field headers in the DCDD to align with global field headers defined for the component library in order to ensure that data subsequently imported from the DCDD into the component library matches the data format (e.g., field header description and order) defined by the component library regardless of the origin of the DCDD.

In one implementation, the system: identifies expected field headers of the DCDD based on the type of the DCDD; and implements natural language processing techniques to identify field headers in the DCDD that are identical or similar to known field headers of known CAD programs. For example, the system can identify the DCDD as a "mechanical-type", as described above; based on the type of the DCDD, the system can anticipate field headers such as "Material," "Dimension," "Weight," "Thread Pitch," and "Drive Type" in the DCDD. (The system can also anticipate field headers such as "Capacitance," "Resistance," and "Voltage" in "electrical-type" DCDDs). In this example, the system can then implement natural language processing to identify a field header including "mat." in the DCDD and to map the field header "mat." to the global field header "Material." The system can then inject a pointer to this "Material." global field header into the "mat." field header in the DCDD or replace the "mat." field header in the DCDD with a "Material." field header accordingly. The system can repeat this process for each other field header detected in the DCDD in order to map these field headers to global field headers defined in the component library.

Therefore, for each field header in the set of field headers detected in the DCDD, the system can implement natural language processing to match the field header to a corresponding global field header extant in the component library; shift the field header and a column of values under the field header to a column location assigned to the global field header in the component library; and then replace the field header in the DCDD with the corresponding global field header in Block S140. The system can also render the DCDD with updated field headers and field header column locations in the user portal in (near) real-time in order to provide the user with visual feedback while processing the DCDD.

Additionally or alternatively, the system can access a field header map of known unique field header naming conventions of CAD programs described above and characterize relationships between the field headers in the DCDD and the global field headers based on predefined relationships between the field headers in the CAD program—from which the DCDD was exported—and the global field headers. For example, the field header map can include a table of relationships between field headers typically found in DCDDs exported from CAD program A and global field headers. In this example, the field header map can indicate a "CPN" field header found in DCDDs exported from a CAD program corresponds to a "Part Number" global field header in the component library. Based on predefined relationships characterized by the field header map, the system can replace the field header of the DCDD with the corresponding global field header from the component library or otherwise link this field header and values in the column below this field header to this global field header.

Therefore, in Block S140, the system can: detect a set of field headers in the DCDD; access a field header map for the particular computer-aided drafting program, wherein the field header map defines rules for transposing each field header, in the set field headers, in the DCDD to a corresponding global field header in a predefined list of available global field headers in the component library; and then, for each field header in the set of field headers, generate a pointer linking a column of values under the field header in the DCDD to the corresponding global field header in the component library according to the field header map.

During translation of the field headers of the DCDD to align with global field headers, the system can also transform fields of the part descriptor entries to align with rules associated with the global field headers, as described below.

However, the system can align or otherwise transform field headers of the DCDD with global field headers for the component library in any other way.

8. Data Validation

The system can also parse through part descriptor entries of the DCDD to detect missing, incorrect, non-standardized, and/or duplicate part descriptor entries. Generally, once the system aligns field headers of the DCDD to global field headers in Block S140, the system can evaluate part descriptor entries—in particular, each field within each part descriptor entry of the DCDD—to detect deviation of a subset of part descriptor entries from validation rules. The system can define and/or access validation rules based on the type of the DCDD and the global field headers as described below 8.1 Validation Rules Block S150 of the method S100 recites accessing a set of part descriptor rules corresponding to the type of the DCDD. Generally, in Block S150, the system retrieves rules and/or standards for part descriptor entries and fields contained therein for a DCDD of the determined type in Block S120. In particular, the system can access (e.g., from a remote database) a set of part descriptor rules for part descriptor entry fields under field headers identified in the DCDD for the type of the DCDD. For example, these part descriptor rules can define industry standard protocols for: formatting fields for part descriptor entries; content (e.g., character strings, numerical values) contained in fields of part descriptor entries; field prioritization (e.g., essential fields versus secondary fields) for particular categories of part descriptor entries; and/or fields for which omission of data is or is not allowed; etc. Once the system accesses these contextualized rules for the type of the DCDD in Block S150, the system can evaluate part descriptor entry fields in the DCDD, identify fields that fail these rules in Block S160, and either automatically correct a failed field or prompt the user to manually correct the failed field in Block S162.

In one implementation, the system accesses: a first subset of part descriptor rules specifying essential field headers for part descriptor entries based on the type of DCDD; and a second subset of part descriptor rules for allowed (or excluded) values within fields for a particular part descriptor entry based on a category of the particular part descriptor entry. In this implementation, the first subset of part descriptor rules can specify particular field headers that are required for describing part descriptor entries in a DCDD of a particular type, such as a minimum subset of field headers required to distinguish a unique part descriptor entry from any other possible part descriptor entry. For example, the system can automatically implement global part descriptor rules specifying that any DCDD include both "Part Number," "Description," and "Quantity" field headers. In this example, the system can also append this set of global part descriptor rules with a first subset of part descriptor rules specifying that "Material," "Manufacturing Process," "Finish," "Color," and/or "Dimensions" field headers are essential for a mechanical-type DCDD. In this example, while a mechanical-type DCDD may include (many) more field headers and include (many) part descriptor entries with values across these (many) field headers, the system can implement this first subset of part descriptor rules to require that all part descriptor entries in a mechanical-type DCDD include a value under each of the "Material," "Manufacturing Process," "Finish," "Color," and/or "Dimensions" field headers in the DCDD. Thus, upon detecting a particular part descriptor entry in a mechanical-type DCDD that omits a value under a "Material" field header, the system can flag this particular part descriptor entry and prompt the user to complete this field in Block S160 described below. Therefore, the system can: access a first subset of contextualized part descriptor rules specifying essential (e.g., required or minimum) field headers for a particular DCDD type in Block S150; and flag each part descriptor entry in a DCDD of this type that omits a value from any one of these essential field headers in Block S160.

In this implementation, the second subset of part descriptor rules can specify inclusion criteria that define possible values (e.g., absolute values or value ranges) in fields within one part descriptor entry, such as: globally; based on the type of the DCDD; or based on other fields within the part descriptor entry. For example, for a particular part descriptor entry containing the value "Plastic" in the "category" field, the system can access a first part descriptor rule specifying that "Polycarbonate", "ABS", "Nylon", or another plastic material type is expected under the "Material" field header for the particular part descriptor entry; a second part descriptor rule specifying that an "Injection-Molded," "Extruded," "Vacuum-formed," "Additively-manufactured," or other value for plastics manufacturing is expected under the "Manufacturing Process" field header for the particular part descriptor entry; and a third part descriptor rule specifying that a "Class A," "Class B," or "N/A" value is expected under a "Finish" field header for the particular part descriptor entry; etc.

In another example, the system can: extract a first value, for a first part descriptor entry, under a category header in the set of field headers in the DCDD; implement natural language processing to interpret the first value as a first category of the first part descriptor entry; access a part descriptor rule specifying a set of allowed values for a second field in part descriptor entries in the first category; and then serve a prompt to manually correct the first part descriptor entry via the user portal in response to a second value in the second field in the first part descriptor entry omitting a value contained in the set of allowed values specified by the part descriptor rule for part descriptor entries in the first category.

The system can therefore access inclusion-type rules for a second field in a part descriptor entry based on a value in a first field in the part descriptor entry in Block S150; the system can then flag this part descriptor entry for manual evaluation in Block S160 responsive to the second field in the part descriptor entry omitting a value specified by this inclusion-type rule associated with a first value in the first field in the part descriptor entry. The system can similarly access and implement an exclusion-type rule, including flagging a part descriptor entry for manual evaluation in Block S160 responsive to a second field in the part descriptor entry including a second value specified by an exclusion-type rule associated with a first value in the first field in the part descriptor entry. Therefore, the system can access a second subset of contextualized part descriptor rules that relate values across two or more field headers within a part descriptor entry.

8.2 Evaluation

Block S160 of the method S100 recites detecting deviation of a particular part descriptor entry, in the set of part descriptor entries, from the set of part descriptor rules. Generally, in Block S160, the system can evaluate part descriptor entries of the DCDD and identify anomalies and omissions of fields by comparing part descriptor entries with corresponding part descriptor rules.

In one implementation, the system implements natural language processing and/or pattern matching techniques to confirm alignment between each field value in the DCDD with the set of part descriptor rules. In response to detecting deviation from one or more part descriptor rules in a particular part descriptor entry, the system can flag the part descriptor entry for secondary confirmation and/or manual correction by the user, such as in real-time or following validation of the entire DCDD.

For example, the system can detect deviation of a part number for a particular part descriptor entry from a part descriptor rule for part numbers. In this example, the system can detect a part number field value of "10-0A01" rather than a part number similar to "10-00001" under the part number field header for the particular part descriptor entry. Thus, the system can flag the part number field value and the particular part descriptor entry for review.

In another implementation, the system can apply context-aware part descriptor rules to detect deviant fields and/or part descriptor entries in the DCDD. For example, the system can read a part name field value of "Buy Chicken" under a part name field header. In this example, the system can access and evaluate the part name field value according to a first part descriptor rule dictating that allowed part name fields under the part number field header are strings of alphanumeric characters. Thus, the system can mark the part name field value as compliant with the first part descriptor rule. However, the system can also evaluate the part name field value according to a second part descriptor rule dictating that, for part descriptor entries with a category field value of "Screw," allowed part name fields under the part name field header include a substring of "SCREW" and include numerical information relating to dimensions and specifications of the screw (e.g., "SCREW, ¼"-20 Thread, ⅝" Long"). Thus, in this example, the system can flag the field value as deviating from the second part descriptor rule.

Additionally, the system can denote fields of part descriptor entries that deviate from predefined ranges of allowed values delineated by a part descriptor rule. In this implementation, the part descriptor rule can define a set of allowed fields given the field header and the type of the DCDD. In response to detecting a field value—within a part descriptor entry—outside the set of allowed values, the system can flag the field value and the part descriptor entry as aberrant. For example, a field value in the DCDD can list a material of "18-7 Stainless Steel." However, the part descriptor rule defines a set of allowed materials for the field of "18-8 Stainless Steel" and "17-7 Stainless Steel." Thus, the system can flag the field value as deviating from the set of allowed materials.

Furthermore, the system can detect and flag empty (i.e., blank) fields, such as for field headers designated as essential for the DCDD type. For example, the system can: upload the DCDD via the user portal at a first time in Block S110; detect absence of a first value in a first field in a first part descriptor entry—which violates a part descriptor rule for essential fields for this DCDD type—in Block S160; and then serve a prompt to manually correct the first part descriptor entry to include highlighting the first field in the first part descriptor entry within the user portal at approximately the first time (i.e., in near real-time) in Block S162. In this example, the system can also: detect a second field in a second part descriptor entry in the DCDD containing a second value conflicting with a third value in a third field in the second part descriptor entry according to a second part descriptor rule in the set of part descriptor rules; and then highlight the second field and the third field in the second part descriptor entry within the user portal at approximately the first time (i.e., in near real-time) in Block S162. Finally, the system can import the set of part descriptor entries into the component library at a second time succeeding the first time in Block S190 following manual insertion of: a first value into the first field in the first part descriptor entry; a replacement second value into the second field in the second part descriptor entry; and a replacement third value into the third field in the second part descriptor entry.

Furthermore, in the foregoing example, the system can receive manual insertion of the first value into the first field in the first part descriptor entry, the replacement second value into the second field in the second part descriptor entry, and the replacement third value into the third field in the third part descriptor entry via the user portal at an intermediate time between the first time and the second time. In response to receipt of the first value, the replacement second value, and the replacement third value, the system can then re-scan the first part descriptor entry and the second part descriptor entry for deviation from the set of part descriptor rules. Finally, the system can import the set of part descriptor entries into the component library at the second time in response to alignment between the first part descriptor entry and the set of part descriptor rules and between the second part descriptor entry and the set of part descriptor rules. However, if the system determines that conflicts still exist between part descriptor entries in the DCDD and the part descriptor rules for the DCDD, the system can repeat processes described above and below to correct these part descriptor entries before importing the DCDD into the component library.

However, the system can identify deviations from the set of part descriptor rules in any other way.

8.3 Auto-Correction

In one implementation, upon detecting an aberrant part descriptor entry, the system can then attempt to automatically correct one or more fields that conflict with part descriptor rules accessed by the system in Block S150. For example, the system can: identify a supplier likely to carry a component represented by the part descriptor entry based on a category value contained in a "Category" field in the part descriptor entry; extract a part number value from a "Part Number" field in the part descriptor entry; query a digital catalog (or database, etc.) hosted by the supplier for this part number value; and repeat this process for additional suppliers associated with products of this category value of the part descriptor entry. If the system fails to identify this part number value in this category value in a supplier's electronic catalog, the system can flag the part descriptor entry and prompt the user to manually correct this part descriptor entry via the user portal. However, if the system succeeds in identifying this part number value in this category value in a supplier's electronic catalog, the system can: download a corpus of data for the part number value; and automatically populate all fields intersection the part descriptor entry with corresponding values from this corpus of data or selectively replace values in aberrant fields in part descriptor entry with corrected values from this corpus of data. (The system can also leverage values contained in other fields in the part descriptor entry—such as other fields not conflicting with part descriptor rules selected by the system—to further verify that a component in the supplier's electronic catalog that matched to the part number value matches other descriptors of the part descriptor entry and is therefore likely to represent the same component before transposing values from the electronic catalog into the fields in the part descriptor entry.)

In another example, the system can: interpret a first value in a first field, in a first part descriptor entry, under a category header in the set of field headers in the DCDD as a category of the first part descriptor entry; interpret a second value in a second field, in the first part descriptor entry, under a part number header in the set of field headers in the DCDD as a part number of the first part descriptor entry; select a particular vendor associated with products in the category of the first part descriptor entry; query a digital catalog associated with the particular vendor for a corpus of field data associated with the part number of the first part descriptor entry; and then verify correspondence between the corpus of field data and the first part descriptor entry based on alignment between a third value in a third field in the first part descriptor entry and a second value in the corpus of field data. In response to verifying correspondence between the first corpus of field data and the first part descriptor entry, the system can populate fields in the set of aberrant fields in the second part descriptor entry with corresponding values from the first corpus of field data in Block S170. (The system can also serve a prompt to confirm the replacement of values in these aberrant fields with values from the corpus of field data via the user portal in Block S172.) However, in response to failure to verify correspondence between the corpus of field data and the first part descriptor entry, the system can serve a prompt—via the user portal—to manually correct the first part descriptor entry. In this example, the system can therefore leverage an existing electronic library of components to automatically correct a field in a part descriptor entry after detecting a conflict with a part descriptor rule and execute this process for each part descriptor entry in the DCDD automatically following import in Block S110. However, the system can also revert to prompting manual correction of this part descriptor entry if the system fails to identify a known commodity component that matches a subset of fields in the part descriptor entry or fails to identify a unique (i.e., only one) commodity component that matches a subset of fields in the part descriptor entry.

In the foregoing example, when populating fields in the set of aberrant fields in the first part descriptor entry with corresponding values from the first corpus of field data in Block S170, the system can populate a first subset of fields in the set of aberrant fields in the second part descriptor entry with corresponding values from the first corpus of field data, wherein the first subset of fields correspond to preferred field headers from the first vendor, such as field headers that the first vendor has historically provided with high accuracy and completeness compared to other vendors for components in this category. In this example, the system can also: select a second vendor associated with products in the category of the second part descriptor entry; query a second electronic catalog associated with the first vendor for a second corpus of field data associated with the part number of the second part descriptor entry; and, in response to verifying correspondence between the second corpus of field data and the second part descriptor entry, populate a second subset of fields in the set of aberrant fields in the second part descriptor entry with corresponding values from the second corpus of field data, wherein the second subset of fields corresponds to preferred field headers from the second vendor—such as field headers that the second vendor has historically provided with high accuracy and completeness compared to other vendors for components in this category—and distinct from preferred field headers from the first vendor. The system can therefore leverage electronic catalogs from multiple vendors and preloaded knowledge of which of these electronic catalogs contain accurate part data under certain field headers in order to verify, correct, and/or complete fields in a part descriptor entry.

In a similar example, for each part descriptor entry in the set of part descriptor entries in the DCDD, the system can: interpret a first value in a first field, in the part descriptor entry, under a part number header in the set of field headers in the DCDD as a part number of the part descriptor entry; query a digital catalog associated with a vendor for a corpus of field data associated with the part number of the part descriptor entry; and implement natural language processing to detect conflicts between values in the part descriptor entry under field headers and corresponding values in the corpus of field data. In response to detecting less than a threshold number of conflicts between the part descriptor entry and the corpus of field data—which may indicate that the corpus of field data is properly matched to the part descriptor entry (e.g., a commodity component)—the system can then populate fields in the part descriptor entry with values from the corpus of field data in Block S170. However, in response to detecting more than the threshold number of conflicts between the part descriptor entry and the corpus of field data—which may indicate that the corpus of field data is not properly matched to the part descriptor entry (e.g., a custom component)—the system can serve a prompt to manually correct the part descriptor entry via the user portal in Block S162.

The system can execute the foregoing process to leverage existing electronic catalogs from external suppliers in order to automatically populate and/or correct fields in a part descriptor entry corresponding to a commodity component (e.g., an "off-the-shelf" fastener, display, battery, or button). However, for a part descriptor entry corresponding to a custom component (or to a commodity component but containing insufficient information to identify this commodity component in a supplier's electronic catalog), the system can interface with the user via the user portal to correct or populate a field in the part descriptor entry. For example, as the system sequentially scans through each part descriptor entry in the DCDD (e.g., from top to bottom) and detects an aberrant part descriptor entry (and fails to correct the aberrant part descriptor entry with data accessed from an external electronic catalog), the system can serve a prompt to correct the aberrant part descriptor entry to the user in real-time via the user portal in Block S162. In this example, the system can highlight aberrant part descriptor entries within a visualization of the DCDD rendered within the user portal; as the user manually addresses and corrects these fields, the system can repeat the foregoing process to recheck that content contained in these fields fulfills corresponding part descriptor rules.

Alternatively, upon completion of a scan of the DCDD, the computer system can aggregate prompts to correct aberrant part descriptor entries and serve the prompts to the user en masse via the user portal in Block S162.

9. Duplicates

Block S180 of the method S100 recites, in response to detecting a subset of like part descriptor entries in the set of part descriptor entries, consolidating the subset of like part descriptor entries into a single part descriptor entry. Generally, in Block S180 and as shown in FIG. 3, the system can merge duplicate part descriptor entries to prevent creation of multiples of the same part descriptor entry in the component library. For example, duplicate part descriptor entries can convolute the component library, necessitate updating all of the duplicate part descriptor entries rather than a single part descriptor entry, and confuse suppliers during production if duplicate part descriptor entries are not identical.

In one implementation, the system can implement natural language processing and/or string comparisons to locate identical or strongly similar part descriptor entries within the DCDD. In this implementation, the system can track and compare all fields of the set of part descriptor entries rather than tracking and comparing a singular field value, such as a part name. If all or a threshold proportion of fields in a subset of part descriptor entries align, the system can flag this subset of part descriptor entries as duplicates and then consolidate the subset into a single part descriptor entry automatically. Alternately, the system can flag this subset of part descriptor entries and prompt the user to manually confirm these entries as duplicates before consolidate the subset into a single part descriptor entry, such as with supervision of the user if several but not all fields in a subset of part descriptor entries align. Thus, the system can contextualize part descriptor entries to find functionally redundant part descriptor entries rather than alphanumerically identical part descriptor entries.

For example, the system can detect a first part descriptor entry with fields of "Category: O-Ring", "ID: 7 mm," "OD: 9 mm," and "Durometer: 70A"; and a second part descriptor entry with fields of "Category: O-Ring," "ID: 7 mm," "Durometer: 70A," and "Width: 2 mm." In Block S180, the system can identify first and second part descriptor entries as substantially redundant (with a high degree of confidence) and therefore consolidate the first and second part descriptor entries into a singular part descriptor entry with fields of "Category: O-Ring", "ID: 7 mm," "OD: 9 mm," "Durometer: 70A", and "Width: 2 mm."

Furthermore, the system can identify part descriptor entries as duplicates or near similar parts in response to detecting a majority of like field entries and a minority of deviating field entries in particular fields in which allowed deviations are defined. For example, the system can detect a first part descriptor entry with part name "RES 10k 0402 1%" and a second part descriptor entry with part name "RES 10K 0402 5%," the first and second part descriptor entries different in their value tolerances (i.e., "1%" versus "5%"). In this example, the system can identify the first and second part descriptor entries as potentially interchangeable (depending on usage context) and prompt the user to select either the first or the second part descriptor entry for entry into the component library.

In one example, for a first field heading in the DCDD, the system can implement natural language processing to compare values in part descriptor entries in the DCDD under the first field heading to isolate a first subset of part descriptor entries containing analogous values under the first field heading. Similarly, for a second field heading in the DCDD, the system can implement natural language processing to compare values in part descriptor entries in the first subset of part descriptor entries under the second field heading in the DCDD to isolate a second subset of part descriptor entries containing analogous values under the second field heading. The system can then calculate a sum of quantities in the second subset of part descriptor entries and consolidate the second subset of part descriptor entries into a single part descriptor entry including the sum under a quantity field header in the DCDD. In this example, the system can also: reorder part descriptor entries in the DCDD to group the second subset of part descriptor entries; highlight the second subset of part descriptor entries in the user portal; render a prompt within the user portal to confirm consolidation of the second subset of part descriptor entries; and then consolidate the second subset of part descriptor entries into the single part descriptor entry according to a naming convention specified in the set of part descriptor rules in response to confirmation consolidation of the second subset of part descriptor entries from a user via the user portal.

However, the system can detect and consolidate redundant part descriptor entries in any other way in Block S180.

10. Correction and Customization

Block S162 of the method S100 recites, at the user portal, serving a prompt to manually correct the particular part descriptor entry. Generally, in Block S162, the system can highlight (and/or isolate) anomalous part descriptor entries from other part descriptor entries in the user portal to prompt the user to manually correct part descriptor entries deviating from the set of part descriptor rules and/or inform the system that a particular deviation is allowed to the user.

In one implementation, the system can shift the particular part descriptor entry deviating from the set of part descriptor rules to a top of the user portal and highlight (e.g., with red outline) the field deviating from the set of part descriptor rules. The system can also issue a prompt indicating how the field deviates from the set of part descriptor rules and the format of an allowed field in compliance with the set of part descriptor rules. Furthermore, the system can serve to the user portal a text entry box, drop-down menu, or any other entry graphic into which the user may enter correction of the part descriptor entries. In response to receipt of the correction, the system can update the DCDD and the part descriptor entries to correspond with the correction and recheck compliance with the set of part descriptor rules.

10.1 Custom Fields and User Preferences

Figure 2:
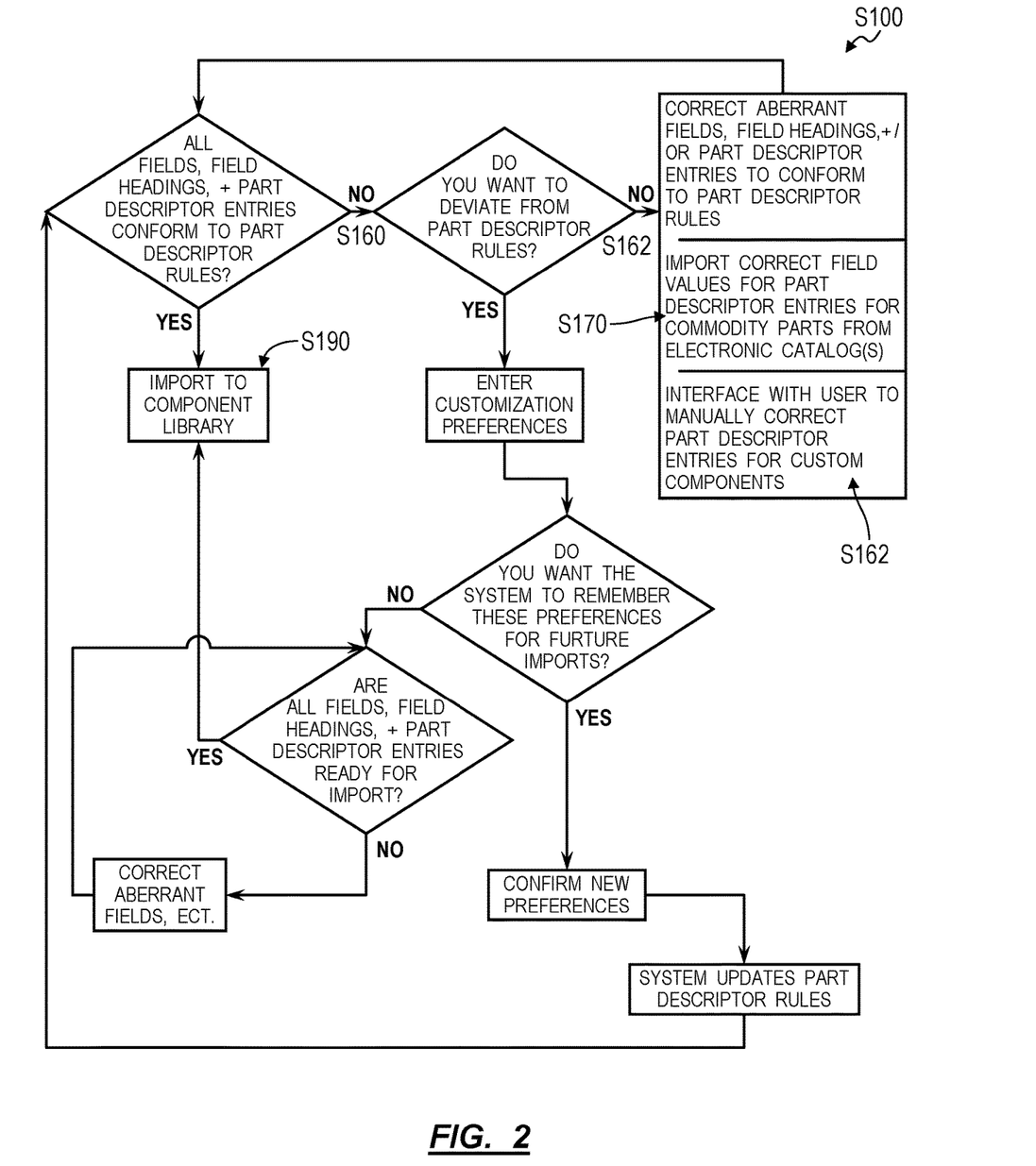
FIG. 2 is a flowchart representation of a variation of the method.

In one variation of the method S100 shown in FIG. 2, the system can serve part descriptor entries deviating from the part descriptor rules to the user, and the user may elect to override the part descriptor rules rather than correct the part descriptor entries to conform with existing part descriptor rules. In this variation, the system can dynamically update and adapt to user preferences rather than resolutely enforcing part descriptor rules that the user may deem irrelevant, out of date, and/or incorrect. Thus, the system can enable a manual override (or "customization") option for the user. In response to receiving confirmation that the user wishes to override the part descriptor rules, the system can update, add, and/or delete the part descriptor entries, part descriptor rules, field headers, fields, etc. with custom entries selected or defined by the user.

10.2 Learning and Automated Correction

In one implementation, the system can guide customization of field headers, part descriptor entries, part descriptor rules, fields, etc. by learning the customization preferences of a particular user and applying the customization preferences consistently throughout the component library for the user.

For example, at a first time, the system can upload a first DCDD from a user with field headers "CPN", "Sourcing Info" and "Component Description." In Block S140, the system can suggest redefining the field headers to correspond with global field headers "Part Number", "Supplier", and "Part Description." However, the system can receive from the user a command to distinguish the field headers from the DCDD from the suggested global field headers, such that "CPN" and "Part Number"; "Sourcing Info" and "Supplier"; and "Component Description" and "Part Description" form six distinct field headings. Thus, at a second time succeeding the first time, the system can upload a second DCDD from the user and automatically generate the six distinct field headers "CPN", "Part Number", "Sourcing Info", "Supplier", "Component Description" and "Part Description" without prompt by the user at the second time.

Additionally, the system can guide customization of field headers, part descriptor entries, part descriptor rules, fields, etc. by learning the customization preferences of a group of users (and/or across global group of users of the PLM software) by applying the customization preferences consistently for all users in the group of users. For example, the system can detect that a group of users (e.g., within a single company or other institution) including a first user, a second user, and a third user prefer the field heading "PN" rather than "Part Number" and prefer the format of the part number to be "100-0001" rather than "10-00001." Thus, for users in the group, the system can propagate the preferences throughout the assembly libraries of the group of users and apply the preferences for all subsequent imports of DCDDs and/or individual part descriptor entries by users in the group.

10.3 Part Naming

In one variation, the system automatically generates a part name for a part descriptor entry based on values contained in fields of the part descriptor entry. In one implementation, to generate a part name, the system parses part categories to create the part name (i.e., a string) that corresponds to a part naming convention (e.g., industry naming best practices, a company-wide part naming convention, and/or a system-wide part naming convention) and other part descriptor rules. The system can then present the part name to the user for approval and/or manual correction.

Similarly, the system can complete fields of part categories according to fields described within a part name entered into the user portal. The system can parse the part name string to identify fields and automatically complete (or "fill in") fields of part categories for entry into the component library. For example, a user may enter a part name "RES 10k 5% 0402" to describe a resistor into the user portal. In this example, the system can extract the sequence "RES" from the part name string to automatically identify the part descriptor entry as a "Resistor" with a resistance of "10k" and fill in the "Part Category" and "Resistance" fields of the part descriptor entry accordingly.

However, the system can generate consistent part names from fields entered into part categories according to the part naming convention in any other way.

11. Gateway

Block S190 of the method S100 recites, in response to alignment between the DCDD and the set of part descriptor rules, importing the set of part descriptor entries into a component library. Generally, upon confirmation that part descriptor entries of the DCDD and fields of the part descriptor entries conform to predefined part descriptor rules and/or that deviations from part descriptor rules are allowed to the user, the system can release the part descriptor entries from validation into the component library. Thus, in Block S190, the system can import parameterized part descriptor entries to a sortable and searchable component library—associated with a physical assembly—accessible through the user portal.

By executing the foregoing Blocks of the method S100 before importing part descriptor entries from the DCDD into the component library in Block S190, the system can reduce or eliminate erroneous, duplicate, non-standard, and otherwise aberrant part descriptor entries from entering the component library, thereby ensuring that subsequent outputs of the component library (e.g., a bill of materials for production of a physical assembly) contain sound and accurate information.

In one variation, the system can: selectively import a first subset of part descriptor entries in the DCDD into the component library in response to alignment between the first subset of part descriptor entries and the set of part descriptor rules; and withhold import of a second subset of part descriptor entries into the component library in response to misalignment between the second subset of part descriptor entries and the set of part descriptor rules in Block S190.

12. Part-Wise Import

In one variation, the system can also accept and upload individual part descriptor entries. Generally, in this variation, the system can enable a user to upload (e.g., manually input) singular part descriptor entries rather than upload an entire, multi-component DCDD into the component library.

In this variation, the system can receive a selection of a part descriptor entry type (e.g., mechanical or electrical). Based on the part descriptor entry type, the system can serve a dropdown menu of part categories relevant to the part descriptor entry type (e.g., "Capacitor" for an electrical part descriptor entry type). Based on the part category selected by the user, the system can automatically generate a part number for the part descriptor entry. Based on the part category, the system can also generate prompts for a user to input fields relevant to the part category (e.g., "Capacitance Value (uF)"). The system can also serve a document upload window for importing a specification sheet and/or CAD part file (e.g., of ISO 10303 STEP file format) to the component library. Alternatively, the system can import relevant fields from a vendor part number and/or vendor URL entered by the user into the user portal. Upon entry of relevant fields, the system can detect deviation of an individual part descriptor entry from the set of (predefined) part descriptor rules; prompt a user to manually correct the individual part descriptor entry; and, in response to alignment between the individual part descriptor entry and the set of part descriptor rules, import the individual part descriptor entry to the component library. Furthermore, the system can serve an option to enter the individual part descriptor entry into an assembly BOM within the component library.

As described above, the system can automatically generate a part name for the individual part descriptor entries based on the fields entered (e.g., manually) into part categories relevant to the part descriptor entry. The system can apply methods and techniques described above to receive a part name (e.g., manually input by a user or imported from a tool, such as a CAD program, or a website), parse the part name to identify fields defined in the part name, correct and/or identify inconsistencies between fields defined in the part name and fields defined in part categories, and correct deviations between the part name and the part naming convention. Thus, the system can be configured to import consistent and relevant part names for each part descriptor entry into the component library, such that each part name directly corresponds to fields entered into part categories and conforms to predefined part naming conventions.

In a similar implement, the system can: initializing a new part descriptor entry containing a set of empty fields in response to selection of a part-wise import function at the user portal; receive selection of a part descriptor entry type for the new part descriptor entry; render a dropdown menu of part categories for the part descriptor entry type within the user portal based on the part descriptor entry type; and then render prompts to manually input values into a subset of fields, in the set of empty fields, associated with a part category selected from the dropdown menu at the user portal. Then, in response to entry of a value into a field in the subset of fields, the system can: query a digital catalog for a unique part fulfilling values extant in the subset of fields, the electronic catalog hosted by a vendor associated with products in the category; and populate remaining fields in the new part descriptor entry with values from a corpus of field data associated with the unique part in the electronic catalog in response to identifying a unique part fulfilling values extant in the subset of fields. However, in response to failure to identify a unique part fulfilling values extant in the subset of fields, the system can render a prompt to manually enter values into additional fields in the subset of fields. The system can repeat this process until a quantity of possible commodity components that meet all values entered into this new part descriptor entry is narrowed down to one unique component. Then, in response to identifying this unique component that aligns with (e.g., is analogous to) all values extant in the subset of fields and populating remaining fields in the new part descriptor entry, the system can import the new part descriptor entry into the component library.

However, the system can apply any method or combination of methods described above to correct and/or adapt to deviations from the set of part descriptor rules for part descriptor entries input into the system manually and/or individually.

13. Export Scrub

In another variation, the system can implement similar validation techniques to ensure integrity, consistency, and accuracy of fields of part descriptor entries during export of part descriptor entries from the component library.

The systems and methods described herein can be embodied and/or implemented at least in part as a machine configured to receive a computer-readable medium storing computer-readable instructions. The instructions can be executed by computer-executable components integrated with the application, applet, host, server, network, website, database, communication service, communication interface, hardware/firmware/software elements of a user computer or mobile device, wristband, smartphone, or any combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any computer readable media such as RAMs, ROMs, flash memory, EEPROMs, optical devices (CD or DVD), hard drives, floppy drives, or any device. The computer-executable component can be a processor but any dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method for normalizing manufacturing data comprising:
at a user portal, uploading an digital component description document comprising a set of part descriptor entries describing a set of physical parts;
identifying a type of the digital component description document based on categories of physical parts described in part descriptor entries within the digital component description document;
identifying a particular computer-aided design program that output the digital component description document based on the type of the digital component description document and a set of field headers extracted from the digital component description document;
based on the particular computer-aided design program, aligning the set of field headers extracted from the digital component description document to global field headers defined in a component library;
accessing a set of part descriptor rules corresponding to the type of the digital component description document;
detecting deviation of a first part descriptor entry, in the set of part descriptor entries, from a first part descriptor rule in the set of part descriptor rules;
at the user portal, serving a prompt to manually correct the first part descriptor entry;
in response to detecting a subset of like part descriptor entries in the set of part descriptor entries, consolidating the subset of like part descriptor entries into a single part descriptor entry; and
in response to alignment between the digital component description document and the set of part descriptor rules, importing the set of part descriptor entries into the component library.

2. The method of claim 1:
wherein loading the digital component description document comprises loading a digital bill of materials comprising a set of part descriptor entries of a first set of physical commodity parts and a second set of physical custom parts, each part descriptor entry comprising a part number, a part name, and a category of a corresponding physical part; and
wherein importing the set of part descriptor entries into the component library comprises importing the set of part descriptor entries into the component library associated with a physical assembly.

3. The method of claim 1, wherein identifying the type of the digital component description document comprises:
detecting the set of field headers in the digital component description document;
extracting a set of values, for the set of part descriptor entries, under a category header in the set of field headers in the digital component description document;
implementing natural language processing to interpret values, in the set of values, as a set of category types; and
identifying the type of the digital component description document as one of a mechanical-type and a digital-type based on a predefined digital component description document rule and a combination of unique category types in the set of category types.

4. The method of claim 1, wherein identifying the particular computer-aided design program of the digital component description document comprises:
retrieving a list of computer-aided drafting programs associated with the type of the digital component description document from a registry of computer-aided drafting programs;
for each computer-aided drafting program in the list of computer-aided drafting programs, accessing a field header model defining a field header naming scheme for the computer-aided drafting program;
detecting the set of field headers in the digital component description document; and
isolating the particular computer-aided drafting program, from the list of computer-aided drafting programs, based on alignment between the set of field headers and the field header model for the particular computer-aided drafting program.

5. The method of claim 1, wherein aligning the set of field headers extracted from the digital component description document to global field headers defined in the component library comprises:
- detecting the set of field headers in the digital component description document;
- accessing a field header map for the particular computer-aided drafting program, the field header map defining rules for transposing each field header, in the set field headers, in the digital component description document to a corresponding global field header in a predefined list of available global field headers in the component library; and
- for each field header in the set field headers, generating a pointer linking a column of values under the field header in the digital component description document to the corresponding global field header in the component library according to the field header map.

6. The method of claim 1, wherein aligning the set of field headers extracted from the digital component description document to global field headers defined in the component library comprises:
- detecting the set of field headers in the digital component description document;
- for each field header in the set of field headers in the digital component description document:
  - implementing natural language processing to match the field header to a corresponding global field header extant in the component library;
  - shifting the field header and a column of values under the field header to a column location assigned to the global field header in the component library; and
  - replacing the field header in the digital component description document with the corresponding global field header; and
- rendering the digital component description document with updated field headers and field header column locations in the user portal.

7. The method of claim 1:
- wherein uploading the digital component description document comprises uploading the digital component description document via the user portal at a first time;
- wherein detecting deviation of the first part descriptor entry from the first part descriptor rule comprises detecting absence of a first value in a first field in the first part descriptor entry;
- wherein serving the prompt to manually correct the first part descriptor entry comprises highlighting the first field in the first part descriptor entry within the user portal at approximately the first time;
- further comprising:
  - detecting a second field in a second part descriptor entry in the digital component description document containing a second value conflicting with a third value in a third field in the second part descriptor entry according to a second part descriptor rule in the set of part descriptor rules;
  - highlighting the second field and the third field in the second part descriptor entry within the user portal at approximately the first time;
- wherein importing the set of part descriptor entries into the component library comprises importing the set of part descriptor entries into the component library at a second time succeeding the first time following manual insertion of a first value into the first field, a replacement second value into the second field, and a replacement third value into the third field.

8. The method of claim 7:
- further comprising:
  - receiving manual insertion of the first value into the first field, the replacement second value into the second field, and the replacement third value into the third field via the user portal at an intermediate time between the first time and the second time;
  - in response to receipt of the first value, the replacement second value, and the replacement third value, scanning the first part descriptor entry and the second part descriptor entry for deviation from the set of part descriptor rules;
- wherein importing the set of part descriptor entries into the component library comprises importing the set of part descriptor entries into the component library at the second time in response to alignment between the first part descriptor entry and the set of part descriptor rules and between the second part descriptor entry and the set of part descriptor rules.

9. The method of claim 1:
- further comprising:
  - extracting a first value, for the first part descriptor entry, under a category header in the set of field headers in the digital component description document; and
  - implementing natural language processing to interpret the first value as a first category of the first part descriptor entry;
- wherein accessing the set of part descriptor rules comprises accessing a part descriptor rule specifying a set of allowed values for a second field in part descriptor entries in the first category;
- wherein serving the prompt to manually correct the first part descriptor entry comprises serving the prompt to manually correct the first part descriptor entry via the user portal in response to a second value in the second field in the first part descriptor entry omitting a value contained in the set of allowed values specified by the part descriptor rule for part descriptor entries in the first category.

10. The method of claim 1:
- further comprising, in response to detecting deviation of the first part descriptor entry from the first part descriptor rule in the set of part descriptor rules:
  - interpreting a first value in a first field, in the first part descriptor entry, under a category header in the set of field headers in the digital component description document as a category of the first part descriptor entry;
  - interpreting a second value in a second field, in the first part descriptor entry, under a part number header in the set of field headers in the digital component description document as a part number of the first part descriptor entry;
  - selecting a particular vendor associated with products in the category of the first part descriptor entry;
  - querying a digital catalog associated with the particular vendor for a corpus of field data associated with the part number of the first part descriptor entry; and
  - verifying correspondence between the corpus of field data and the first part descriptor entry based on alignment between a third value in a third field in the first part descriptor entry and a second value in the corpus of field data; and wherein serving the prompt to manually correct the first part descriptor entry comprises serving the prompt, via the user portal, to manually correct the first part descriptor entry in response to failure to verify correspondence between the corpus of field data and the first part descriptor entry.

11. The method of claim 1, further comprising
detecting a set of aberrant fields in a second part descriptor entry, in the set of part descriptor entries, deviating from the set of part descriptor rules;
interpreting a first value in a first field, in the second part descriptor entry, under a category header in the set of field headers in the digital component description document as a category of the second part descriptor entry;
interpreting a second value in a second field, in the second part descriptor entry, under a part number header in the set of field headers in the digital component description document as a part number of the second part descriptor entry;
selecting a first vendor associated with products in the category of the second part descriptor entry;
querying a first electronic catalog associated with the first vendor for a first corpus of field data associated with the part number of the second part descriptor entry;
verifying correspondence between the first corpus of field data and the second part descriptor entry based on alignment between a third value in a third field in the second part descriptor entry and a second value in the first corpus of field data; and
in response to verifying correspondence between the first corpus of field data and the second part descriptor entry, populating fields in the set of aberrant fields in the second part descriptor entry with corresponding values from the first corpus of field data.

12. The method of claim 11:
wherein populating fields in the set of aberrant fields in the second part descriptor entry with corresponding values from the first corpus of field data comprises populating a first subset of fields in the set of aberrant fields in the second part descriptor entry with corresponding values from the first corpus of field data, the first subset of fields corresponding to preferred field headers from the first vendor; and
further comprising:
   selecting a second vendor associated with products in the category of the second part descriptor entry;
   querying a second electronic catalog associated with the first vendor for a second corpus of field data associated with the part number of the second part descriptor entry; and
   in response to verifying correspondence between the second corpus of field data and the second part descriptor entry, populating a second subset of fields in the set of aberrant fields in the second part descriptor entry with corresponding values from the second corpus of field data, the second subset of fields corresponding to preferred field headers from the second vendor and distinct from preferred field headers from the first vendor.

13. The method of claim 1, further comprising, for each part descriptor entry in the set of part descriptor entries:
interpreting a first value in a first field, in the part descriptor entry, under a part number header in the set of field headers in the digital component description document as a part number of the part descriptor entry;
querying a digital catalog associated with a vendor for a corpus of field data associated with the part number of the part descriptor entry;
implementing natural language processing to detect conflicts between values in the part descriptor entry under field headers and corresponding values in the corpus of field data;
in response to detecting less than a threshold number of conflicts between the part descriptor entry and the corpus of field data, populating fields in the part descriptor entry with values from the corpus of field data; and
in response to detecting more than the threshold number of conflicts between the part descriptor entry and the corpus of field data, serving a prompt to manually correct the part descriptor entry via the user portal.

14. The method of claim 1:
wherein accessing the set of part descriptor rules corresponding to the type of the digital component description document comprises
   accessing a first part descriptor rule specifying a set of essential fields for part descriptor entries in the type of the electronic component description; and
   accessing a second set of part descriptor rules specifying relationships between field headers;
further comprising, for each part descriptor entry in the digital component description document:
   scanning the part descriptor entry for a value in each field in the set of essential fields specified in the first part descriptor rule; and
   scanning the part descriptor entry for misalignment between values in fields in the part descriptor entry according to the second set of part descriptor rules; and
wherein detecting deviation of the first part descriptor entry from the first part descriptor rule comprises detecting one of a missing value in a field in the set of essential fields and a misalignment between a value in a field in the part descriptor entry and a part descriptor rule in the second set of part descriptor rules.

15. The method of claim 1, wherein importing the set of part descriptor entries into the component library comprises:
selectively importing a first subset of part descriptor entries in the digital component description document into the component library in response to alignment between the first subset of part descriptor entries and the set of part descriptor rules; and
withholding import of a second subset of part descriptor entries into the component library in response to misalignment between the second subset of part descriptor entries and the set of part descriptor rules.

16. The method of claim 1, wherein consolidating the subset of like part descriptor entries into a single part descriptor entry comprises:
for a first field heading in the digital component description document, implementing natural language processing to compare values in part descriptor entries in the digital component description document under the first field heading to isolate a first subset of part descriptor entries containing analogous values under the first field heading;
for a second field heading in the digital component description document, implementing natural language processing to compare values in part descriptor entries in the first subset of part descriptor entries under the second field heading in the digital component description document to isolate a second subset of part descriptor entries containing analogous values under the second field heading;

calculating a sum of quantities in the second subset of part descriptor entries; and consolidating the second subset of part descriptor entries into a single part descriptor entry comprising the sum under a quantity field header in the digital component description document.

17. The method of claim 16:

further comprising:
- reordering part descriptor entries in the digital component description document to group the second subset of part descriptor entries;
- highlighting the second subset of part descriptor entries in the user portal; and
- rendering a prompt within the user portal to confirm consolidation of the second subset of part descriptor entries; and wherein consolidating the subset of like part descriptor entries into a single part descriptor entry comprises consolidating the second subset of part descriptor entries into the single part descriptor entry according to a naming convention specified in the set of part descriptor rules in response to confirmation of consolidation of the second subset of part descriptor entries from a user via the user portal.

18. The method of claim 1, further comprising:

at the user portal, initializing a new part descriptor entry containing a set of empty fields;

receiving selection of a part descriptor entry type for the new part descriptor entry;

based on the part descriptor entry type, rendering a dropdown menu of part categories for the part descriptor entry type within the user portal;

based on a part category selected from the dropdown menu, rendering prompts to manually input values into a subset of fields, in the set of empty fields, associated with the part category at the user portal;

in response to entry of a value into a field in the subset of fields:
- querying a digital catalog for a unique part fulfilling values extant in the subset of fields, the electronic catalog hosted by a vendor associated with products in the category;
- in response to identifying a unique part fulfilling values extant in the subset of fields, populating remaining fields in the new part descriptor entry with values from a corpus of field data associated with the unique part in the electronic catalog; and
- in response to failure to identify a unique part fulfilling values extant in the subset of fields, rendering a prompt to manually enter values into additional fields in the subset of fields; and in response to identifying the unique part aligning with all values extant in the subset of fields and populating remaining fields in the new part descriptor entry, importing the new part descriptor entry into the component library.

19. A method for normalizing manufacturing data comprising:

at a user portal, uploading an digital component description document comprising a set of part descriptor entries describing a set of physical parts;

identifying a type of the digital component description document based on categories of physical parts described in part descriptor entries within the digital component description document;

identifying a particular computer-aided design program that output the digital component description document based on the type of the digital component description document and a set of field headers detected in the digital component description document;

based on a preloaded field header naming scheme associated with the particular computer-aided design program, aligning the set of field headers detected in the digital component description document to global field headers defined in a component library;

for a first part descriptor entry in the digital component description document:
- querying a first electronic catalog for a first commodity component descriptor containing field values analogous to a subset of values in the first part descriptor entry;
- in response to a difference between a particular field value in the first commodity component descriptor and a particular value in a corresponding field in the first part descriptor entry, replacing the particular value in the first part descriptor entry within the particular field value from the first community component descriptor; and
- serving a prompt to confirm the particular field value in the first part descriptor entry via the user portal; and in response to alignment between part descriptor entries in the digital component description document and matched commodity component descriptors accessed from the first electronic catalog, importing the set of part descriptor entries into the component library.

20. The method of claim 19:

further comprising:
- accessing a set of part descriptor rules corresponding to the type of the digital component description document;
- detecting deviation of a second part descriptor entry, in the set of part descriptor entries, from a part descriptor rule in the set of part descriptor rules;
- at the user portal, serving a prompt to manually correct the first part descriptor entry; and
- in response to detecting a subset of like part descriptor entries in the set of part descriptor entries, consolidating the subset of like part descriptor entries into a single part descriptor entry; and wherein importing the set of part descriptor entries into the component library comprises importing the set of part descriptor entries into the component library in response to alignment between the digital component description document and the set of part descriptor rules.

* * * * *